United States Patent [19]

Freedman

[11] 4,329,647
[45] May 11, 1982

[54] METHOD FOR DETERMINING DISTANCE AND DIRECTION FROM AN OPEN WELL TO A CASED WELL USING RESISTIVITY AND DIRECTIONAL SURVEY DATA

[75] Inventor: Robert Freedman, Houston, Tex.

[73] Assignee: Petroleum Physics Corporation, Houston, Tex.

[21] Appl. No.: 270,383

[22] Filed: Jun. 4, 1981

[51] Int. Cl.$^3$ .......................... G01V 3/18; G01V 3/00
[52] U.S. Cl. ..................................... 324/323; 324/366
[58] Field of Search ........................ 324/323, 366–375, 324/347, 338, 339, 355; 33/304, 313; 166/250

[56] References Cited

U.S. PATENT DOCUMENTS

| | | | |
|---|---|---|---|
| 3,256,480 | 6/1966 | Runge et al. | 324/366 |
| 3,748,574 | 7/1973 | Mitchell et al. | 324/323 |
| 3,778,701 | 12/1973 | Runge | 324/366 |

*Primary Examiner*—Gerard R. Strecker
*Attorney, Agent, or Firm*—Neal J. Mosely

[57] ABSTRACT

The invention disclosed herein is a method for determining distance and direction from an open well to a cased well. The method comprises: (1) utilizing resistivity logs obtained in the open well and/or in the cased well before casing is run to determine the thicknesses and resistivities of earth strata which are penetrated by the wells, (2) determining the actual trajectory in the subsurface of the open well from borehole directional survey data, (3) determining theoretically expected resistivities for long and short spaced electrode-type resistivity tools at various depths in the open well for different assumed positions of the cased well relative to the open well, (4) determining measured resistivities for long and short spaced electrode-type resistivity tools by logging the open well, (5) varying the assumed relative positions of the open and cased well to adjust the spacing of the resistivity curves until the expected resistivities match the measured resistivities in a best fit mathematical sense; the amount of variation in assumed relative position required to match the resistivity curves determining the distance of each station in the open well to the cased well, (6) determining the direction of the cased well from the open well by constructing a plan view of the open well trajectory from the directional survey data and utilizing the distances to casing previously determined.

18 Claims, 4 Drawing Figures

METHOD FOR DETERMINING DISTANCE AND DIRECTION FROM AN OPEN WELL TO A CASED WELL USING RESISTIVITY AND DIRECTIONAL SURVEY DATA

BACKGROUND OF THE INVENTION

1. Field of the Invention

This invention relates to a method for utilizing well log data and other measurements to determine the distance and direction between a cased blown out well and an adjacent open (e.g., uncased well) relief well. The intersection of a blown out well by a relief well is frequently required in order to kill the wild well by pumping cement or other fluids into its well bore. It is an extremely difficult and complex engineering problem to effect an intersection in the subsurface at depths frequently greater than 15,000 feet. This problem is much simpler if a method is available for determining the distance of the relief well to the casing during the course of its approach to the target well. The invention is also concerned with the use of similar data and measurements to avoid having two wells intersect, which can be a problem where the wells are drilled from a common starting point such as an off-shore drilling platform.

2. Description of the Prior Art

A number of methods have been proposed for utilizing well logging data to estimate distance and direction from an open well to a cased well. Direction and distance to casing can be estimated by lowering a magnetometer on a wireline into the relief well and measuring the magnetic field and/or its gradient produced by the natural magnetization of the casing. This method is described in U.S. Pat. No. 4,072,200.

A similar method is described by J. D. Robinson and J. P. Vogiatziz in U.S. Pat. No. 3,725,777 and in a publication entitled "Magnetostatic Methods For Estimating Distance And Direction From A Relief Well To A Cased Borehole", *Journal of Petroleum Technology*, v. 24, no. 6, pp. 741-750, June 1972.

A limitation of these methods is that the magnetic field and/or its gradient can be too weak for accurate detection unless the magnetometer is near the end of the casing where the field is strongest. This method is a passive method since it depends on the casing having a natural magnetization. Professor Arthur F. Kuckes of the School of Applied and Engineering Physics at Cornell University has recently developed two active methods for estimating distance and direction from a relief well to a cased target well.

The first method developed by Professor Kuckes and co-workers involves the creation of a low frequency alternating current in the casing of the blown out well by placing electrodes on the surface in the ground near the wild well. The conductivity of the metal casing is roughly $10^6$ times greater than that of the earth so that the current finds it favorable to flow in the casing. Thus, having established an alternating current in the casing the magnetic field produced by this current is measured by a magnetometer placed in the relief well on a wireline cable. Suitable interpretation of the direction and magnitude of the measured magnetic field can be used to estimate both distance and direction to the cased target well. A practical limitation of this method occurs because a blow out frequently results in the separation of casing joints. A result of this is that current leakage from the casing can prevent the induced currents from reaching desired depths with sufficient strength to produce measurable and interpretable magnetic fields.

Professor Kuckes and co-workers have also developed a second active method. This method places both the source current electrodes and the magnetometer in the relief well on a wireline logging cable. In this case the magnetometer measures a reflected magnetic field due to the presence of the casing. This method has serious interpretation problems if the relief well trajectory is not a straight line path. In practice, it is more common for a well to have a tortuous trajectory in space over distances of hundred to thousands of feet. In this case the electrodes producing the current and the magnetometer will not be the same straight line. This results in a primary and secondary magnetic field at the magnetometer. The primary field would be zero if the relief well trajectory were a straight line path.

In meandering wellbores the total magnetic field at the magnetometer consists of both the primary field and the secondary field. The secondary field results from the presence of the casing and therefore it is this field which contains information about the distance and direction of the relief well to the blown out well. In relief wells with tortuous paths it may not be possible to separate the primary and secondary fields with sufficient accuracy to obtain accurate distance and direction estimates using this method.

A different method which is more closely related to the method of this invention is disclosed in U.S. Pat. No. 3,748,574 and described in a publication by F. R. Mitchell et al entitled "Using Resistivity Measurements to Determine Distance Between Wells" printed in the *Journal Of Petroleum Technology*, v. 24, no. 6, pp. 723-741, June, 1972. This patent and publication represent the state of the prior art most relevant to the present invention. The method of the Mitchell et al publication utilizes logging data obtained in the relief well with an Ultra-Long Spaced Electric Log (ULSEL), electrical survey (ES) and induction and/or other shallow investigating resistivity logs. The latter logs are common and familiar to operators engaged in the drilling of oil and/or gas wells. The ULSEL tools were developed and are offered as a service of Schlumberger Well Surveying Corporation. These tools are electrode-type electrical logging tools which have electrode spacings of hundreds to thousands of feet. They were originally developed to provide a resistivity logging method which could have a depth of investigation of hundreds to thousands of feet.

A method for using the ULSEL data to detect salt domes at distances of hundreds to thousands of feet from a well has been described in U.S. Pat. No. 3,256,480. This patent contains a description of the ULSEL tools. The application of the ULSEL tools to salt dome detection was the original impetus for the development of the tool. Salt domes, as is well known, represent structural traps for hydrocarbons and therefore their presence, location and size are of obvious interest to geologists. The ULSEL can detect the presence of salt domes because these structures have anomalously high resistivities as compared to other geological structures present in the subsurface.

The aforementioned publication by Mitchell et al and U.S. Pat. No. 3,748,574 describe a method and field examples wherein ULSEL, ES and induction log data are utilized to estimate distance of a relief well to a cased target well. The ULSEL can be used to detect the presence of casing since in proximity to casing the resistivities measured by the ULSEL are reduced significantly relative to their values in the absence of casing. This reduction in measured resistivities when the casing is within the range of investigation of the ULSEL is a result of the fact that the resistivity of the casing is roughly $10^{-6}$ times that of the earth.

Mitchell et al discuss a method for estimating distance to casing by utilizing the ratio of measured to expected (e.g., theoretically computed in the absence of casing) resistivity. This ratio decreases as the casing is approached by the relief well. A method is proposed for using the aforementioned resistivity ratio to estimate distance to the cased target well. The method proposed by the aforementioned Mitchell et al publication and U.S. Pat. No. 3,748,574 can be described as follows. The relief well is logged with an induction tool in an interval of interest which in practice could range from tens to thousands of feet. Since the depth of investigation of induction logging tools is relatively shallow, the measured resistivities are not affected by proximity to casing provided that the relief well is greater than roughly twelve feet from the target well. The induction log resistivities are used to make a layered resistivity model of the earth which best approximates the actual resistivity versus depth profile determined from the induction log. The number of layers included in the model is variable and in practice could be several hundred.

The effects of resistivity anisotropy are included in the layered model by having, in each layer, a resistivity parallel to the layering planes and a resistivity perpendicular to the layering planes which are not equal in an anisotropic layered earth. Since only a finite number of layers can be included in the model, it is assumed that the layered medium is bounded above and below by semi-infinite half spaces with appropriately chosen resistivities. The theoretically expected response of the ULSEL is calculated for this layered medium. This then gives the theoretical response of the ULSEL in the absence of the cased target well. The method of Mitchell et al assumes that the relief well trajectory is a straight line and therefore that the direction of the relief well has a constant bearing (e.g., angle measured relative to north) and deviation (e.g., angle measured relative to the vertical). A limitation of this method is that in practice a well borehole frequently follows a meandering trajectory in space. Failure to take into account this trajectory leads to errors in the theoretically computed ULSEL responses and, therefore, to errors in distances estimated from the ratio of measured to expected resistivities.

Another limitation of this method is that directional information canot be obtained using the assumption of a straight line path for the relief well. The second step in the Mitchell et al method utilizes the ratio of measured to expected resistivities to estimate distance of the relief well to the cased target well. The step of the method makes an unrealistic and inconsistent approximation. The approximation is that the cased target well is not in a layered medium but is situated instead in an infinite homogeneous medium. This approximation is not valid, is inconsistent with the first step of the method which constructs the layered medel, and therefore it introduces unknown errors in the distances estimated using this method.

SUMMARY OF THE INVENTION

It is an objective of this application to provide a method for utilizing ULSEL, ES, induction and/or other shallow investigating reistivity logs and directional survey data and measurements to account for the trajectory of the relief well and the fact that the casing is in a layered earth in determining distances from the relief well to the cased target well. Moreover, for a tortuous relief well trajectory, the method disclosed herein provides means for determining direction from the relief well to the target well in addition to distance.

A method has been discovered for utilizing resistivity and directional survey log data in order to determine more accurately than heretofore possible distances from a relief well to a cased target well. The method takes into account the actual trajectory of the relief well in space and therefore provides directions as well as distances to the target well.

The increased accuracy of this method results from essentially two improvements over prior art methods. Firstly, in making this invention, it has been discovered that greater accuracy in distance determinations is obtained by incorporating into the method means for taking into account the actual trajectory of the relief well in space. The method determines, at each station depth (e.g., chosen at one foot intervals) in the relief well, the spatial co-ordinates of the stations over a specified depth interval. Thus the actual positions of the ULSEL electrodes "A", "B", "M" and "N" in the relief well are known accurately. This knowledge is essential in order to determine accurate values of expected resistivities which are then compared with measured resistivities to obtain distances and directions to the target well. The assumption of a straight line path, in prior art methods, precluded using resistivity measurement to obtain any directional information.

The method of this invention also provides greater accuracy in determining distances than prior art resistivity methods because the method avoids the inconsistency and inaccuracy present in the prior art. This inconsistency and inaccuracy in the prior art is a result of the procedure for determining distances to the target well. The prior art procedure assumes that the cased target well is in a homogeneous medium rather than in the layered earth. This assumption is invalid and leads to unknown errors in distances determined from prior art resistivity methods. The method of this invention employs a procedure for determining distances which automatically takes into account the fact that the cased target well resides in a layered medium where the resistivities of the layers are determined from the induction log and/or other shallow investigating resistivity logs. The distances to the target well are determined by varying the assumed position of the target well relative to the relief well in order to shift the relative positions of the measured and the expected resistivities. The correct relative position is obtained when the expected (e.g., theoretically calculated for the cased target well in the layered earth) ULSEL and ES resistivities match the measured ULSEL and ES resistivities. The distances to casing of all stations in the relief well are then accurately determined.

Further features and advantages of the invention will become more readily apparent from the following detailed description when taken in conjunction with the accompanying drawings.

DESCRIPTION OF A PREFERRED EMBODIMENT OF THE METHOD

Figure 1:
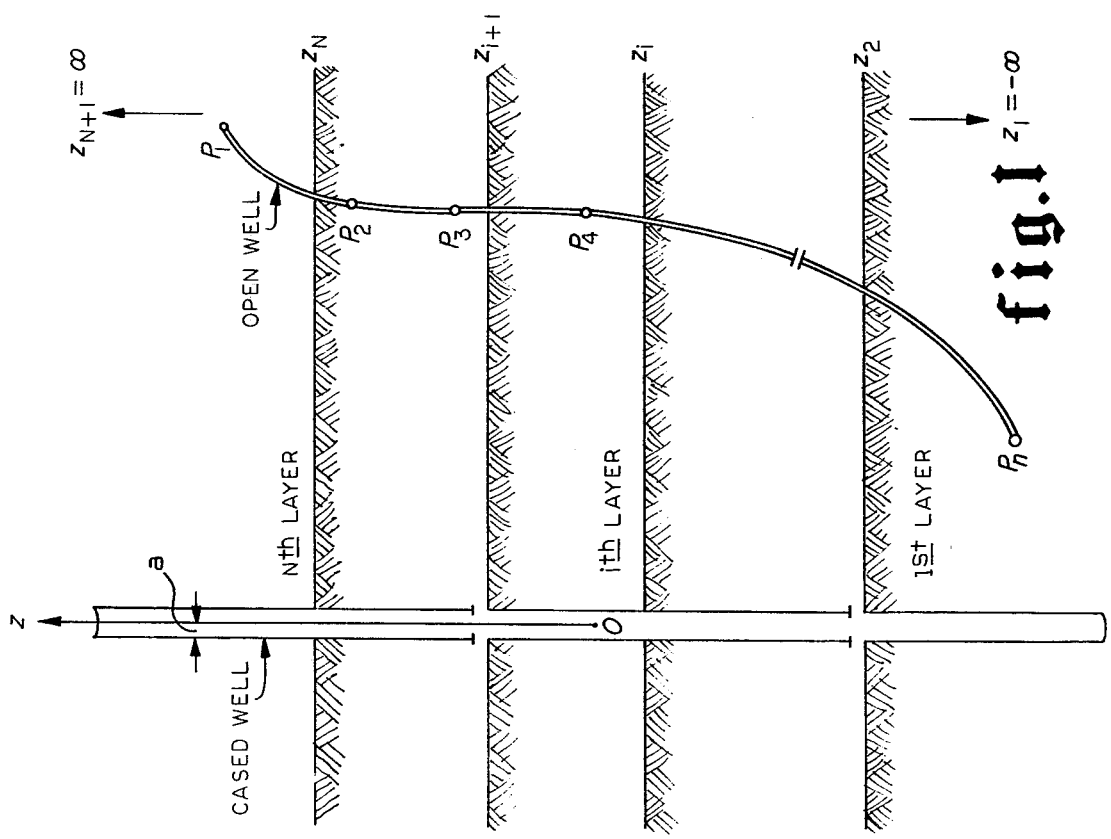
FIG. 1 is a schematic cross-section showing a cased and open well in a layered earth.

In FIG. 1 is shown a schematic cross section of the earth showing a portion of a relief well path as the well approaches a cased target well for a planned intersection. The first step in the method requires determination of the trajectory of the relief well over the depth interval of interest. The drill string is removed from the relief well and a borehole directional survey is taken at various points $P_1, P_2, \ldots, P_n$ in the relief well. At each point the directional survey data consists of a measured depth, a bearing angle and a deviation angle. These two angles specify the direction and orientation of the relief well trajectory at the measured depths.

It would be desirable to have directional survey data at one foot intervals over the depth interval of interest (e.g., from $P_1$ to $P_n$). In practice, the directional survey data is generally not measured at such closely spaced intervals. The direction of the relief well at one foot intervals along its path from $P_1$ to $P_n$, however, can be obtained by interpolating between the measured directional survey data points. Interpolation techniques have been developed and are discussed, for example, in a publication entitled "Directional Survey Calculation" by J. T. Craig, Jr. and B. V. Randall in *Petroleum Engineer*, March 1976.

An induction log is run in the relief well either before or after the directional survey. The induction log resistivity data is used to construct a layered model for the earth. The apparent thicknesses along the path and the resistivities for the respective layers are chosen to best approximate the resistivity profile obtained with the induction tool. Previous induction log runs in the relief well are used to obtain thicknesses and resistivities for depths above $P_1$. The layering structure for depths below $P_n$ can be obtained from induction logs run in the target well. Generally the layering structures above $P_1$ and below $P_n$ do not have a strong influence on the directions and distances to casing determined by this method. In practice it will frequently suffice to approximate these upper and lower zones by infinitely thick layers with suitably chosen resistivities. In each layer the effects of resistivity anisotropy are taken into account by allowing for different formation resistivities in the directions parallel and perpendicular to the layers.

From the survey data, either measured or interpolated at each foot in the interval along the path from $P_1$ to $P_n$, the cartesian co-ordinates $(x'_i, y'_i, z'_i)$ of each station are determined relative to an origin $O'$ chosen at one of the stations, say at station $P_1$. The index i ranges from 1 to $n_s$ where $n_s$ is the number of stations chosen at one foot intervals between $P_1$ and $P_n$.

Figure 2:
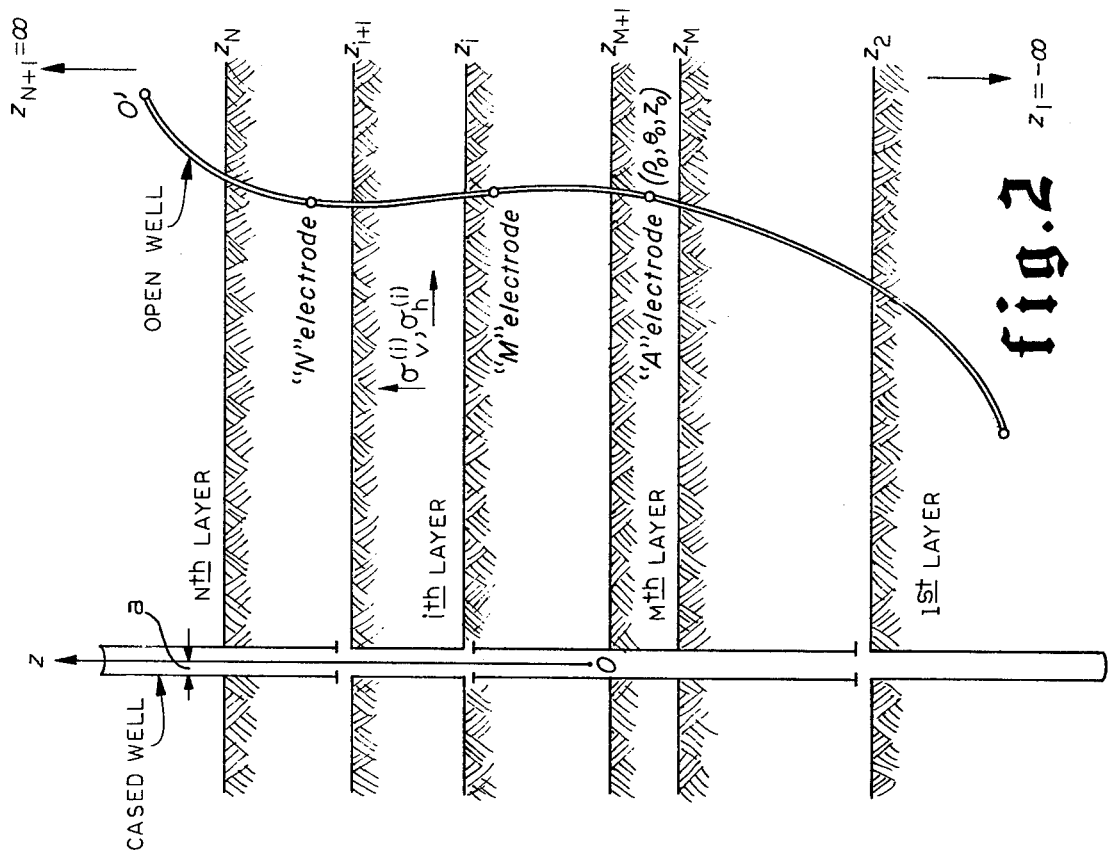
FIG. 2 is a schematic cross-section showing an ULSEL tool with electrodes "A", "M" and "N" in an open well.

In FIG. 2 is shown a schematic cross-section of the earth showing an ULSEL or ES tool situated in the relief well. The tools consist of a current electrode "A" and two voltage measuring electrodes "M" and "N". The current return electrode "B" is not shown in FIG. 2 since, in practice, it is frequently located on the earth's surface in the mud pit. In this case one can assume, for practical purposes, that the spacing AB between the A and B electrodes is infinite since the B electrode does not influence the expected (e.g., theoretically determined) resistivities.

For the short spaced ES tools such as the 16-inch and 64-inch Schlumberger Normal devices the B electrode is in the borehole and has an effect on the expected resistivities. It is well-known to those skilled in the art of electrical logging that it is straightforward to include the effect of the B electrode in determining expected resistivities. Since the inclusion of a B electrode in the borehole would make certain formulas given below unnecessarily complex and is not relevant to the present invention, the discussion given below in conjunction with FIG. 2 will, for simplicity, assume that the B electrode is at infinity. In Table 1 are listed some of the common electrode spacings for ULSEL and ES tools.

TABLE 1

| ULSEL AND ES ELECTRODE SPACINGS | | | |
|---|---|---|---|
| | ELECTRODE SPACINGS (feet) | | |
| TOOL | AM | AN | AB |
| ES TOOL | | | |
| 16-inch Normal | 1.33 | 20 | 89 |
| 64-inch Normal | 5.33 | 71 | 89 |
| 20-foot Normal | 20 | 71 | infinity |
| ULSEL TOOL | | | |
| 75/350 | 75 | 350 | infinity |
| 75/600 | 75 | 600 | " |
| 150/350 | 150 | 350 | " |
| 150/600 | 150 | 600 | " |
| 150/1000 | 150 | 1000 | " |
| 600/2400 | 600 | 2400 | " |
| 1000/2400 | 1000 | 2400 | " |

The method of this invention for determining distances and directions from the relief well to the cased target well involves moving the assumed location of the casing relative to the relief well trajectory which has been determined, as discussed above, using the directional survey data. For each specified location of the target relative to the relief well, the expected resistivities of the various ULSEL and ES devices are determined. The correct location of the target is obtained when the expected resistivities match the measured resistivities obtained by logging the relief well with the same ULSEL and ES devices for which the expected resistivities have been determined.

The following theoretical consideration will make clearer the procedural steps of the method. First the expected resistivities are determined for a given (e.g., specified) position of the target well relative to the relief well. Referring to FIG. 2 a schematic is shown of an ULSEL or ES tool having electrodes A, M and N situated in the borehole of the relief well. Also shown in FIG. 2 is the origin O of a co-ordinate system fixed in the target well. Recall that the co-ordinates $(x'_i, y'_i, z'_i)$ of the relief well are known from the directional survey data at one foot intervals from the points $P_1$ to $P_n$ in FIG. 2. These primed station co-ordinates are relative to an origin $O'$ fixed at one of the stations on the relief well path.

Let the origin O' have cartesian co-ordinates $x_o$, $y_o$, $z_o$ relative to the origin O fixed in the cased target well. The co-ordinates $x_o$, $y_o$, $z_o$ describe the location and position of the target well relative to the relief well. The cartesian co-ordinates ($x_i$, $y_i$, $z_i$) of each station in the relief well relative to the origin O fixed in the casing are:

$$x_i = x'_i + x_o, \quad (1a)$$

$$y_i = y'_i + y_o, \quad (1b)$$

and $$z_i = z'_i + z_o, \quad (1c)$$

where the index $i = 1, 2, \ldots n_s$ is equal to the number of stations situated at one foot intervals along the relief well path. The equations or formulae used throughout this description are numbered parenthetically for purposes of reference.

The distances of each station to the target well are given by $$d_i = ((x'_i + x_o)^2 + (y'_i + y_o)^2)^{0.5} \quad (2)$$

The method of the present invention determines accurate values for ($x_o$, $y_o$) and therefore for the distances from the relief well stations to the cased target well. The method involves "moving" the target well's location theoretically relative to the relief well trajectory by varying the choice for the co-ordinates ($x_o$, $y_o$). The correct values of ($x_o$, $y_o$) are found when the expected resistivities determined for the various ULSEL and ES tools match the measured resistivities obtained from logging these tools in the relief well.

The correct values for ($x_o$, $y_o$) having thus been determined, the distances $d_i$ of each station in the relief well are obtained from formula (2). The greater accuracy provided by the present method over prior art methods is due, in part, to the fact that this method determines expected resistivities for the ULSEL and ES tools, for different assumed positions of the cased target well located as shown in FIG. 2 in a layered medium. The effect of both the casing and the layering on the expected resistivities is therefore properly accounted for by the present method. The requirement that the expected ULSEL and ES resistivities match (in a best fit sense described below) the measured values obtained by logging the relief well then results in more accurate determinations of distance to the target well than are obtained using the prior art method.

In order to distinguish the present method from the prior art method discussed in U.S. Pat. No. 3,748,574, it is necessary to recall the prior art method. The method of U.S. Pat. No. 3,748,574 determines expected resistivities for the ULSEL and ES tools in a layered medium without taking into account the effect of a cased target well on the expected resistivities. That is, the layered medium for which the expected resistivities are determined does not contain a cased target well. The proximity to the cased target well is then inferred when the measured resistivities in the relief well are less than the expected resistivities. The determination of distance from the target well to the relief well is made by assuming that the target well is located in a homogeneous (i.e., nonlayered) medium. Thus, that method is self-contradictory and the distances determined therefrom are subject to unknown uncertainties.

Implementation of the method of this invention requires the ability to determine the expected resistivities for ULSEL and ES tools in a layered medium containing a cased target well. In making this invention, the following formulas were derived for this purpose. The expected resistivities (e.g., also known as apparent resistivities) are determined by solving the Poisson's equation obeyed by the electrostatic potential $\Phi(\rho, \theta, z)$ where ($\rho, \theta, z$) are cylindrical co-ordinates relative to an origin O (e.g., see FIG. 2) fixed in the cased target well.

The formulation of the theory of expected (e.g., apparent) resistivities is well-known and, for example, is discussed by V. N. Dakhnov in *Geophysical Well Logging*, Moscow Petroleum Institute (1959), translated by G. V. Keller in *Colorado School of Mines Quarterly*, Vol. 57, No. 2 (1962). Using the above referenced work and a paper by D. H. Shun entitled "Green's Functions for Composite Media", in the *International Journal of Engineering Science*, Vol. 16, pp. 475–482 (1978), the formulae given below can be developed by those skilled in the art of theoretical physics.

The electrostatic potential $\Phi(\rho, \theta, z)$ at any point in the layered medium containing the relief well and the cased target well can be obtained from the formula, $$\phi(\rho, \theta, z) = \int_0^\infty d\lambda \sum_{n=0}^\infty \epsilon_n \cos n(\theta - \theta_o) F_n(\lambda) G_i^{(n)}(\lambda), \quad (3)$$

where $\epsilon_n = 1$ for $n = 0$ and $\epsilon_n = 2$ for $n > 1$.

In formula (3) the functions $F_n(\lambda)$ and $G_i^{(n)}(\lambda)$ are defined by the formulae $$F_n(\lambda) = \frac{J_n(\lambda\rho) Y_n(\lambda a) - J_n(\lambda a) Y_n(\lambda\rho)}{J_n^2(\lambda a) + Y_n^2(\lambda a)}, \quad (4)$$

and $$G_i^{(n)}(\lambda) = \frac{A_i^{(n)}}{J(z_o)} (\lambda)(a_m e^{a_m \lambda z_o} + b_m e^{-a_m \lambda z_o})(c_i e^{a_i \lambda z} + d_i e^{-a_i \lambda z}), \quad (5)$$

where, $$A_i^{(n)}(\lambda) = \frac{I}{2\pi\sigma_v^{(m)}} (J_n(\rho_o \lambda) Y_n(\lambda a) - Y_n(\lambda\rho_o) J_n(\lambda a)), \quad (6)$$

and, $$J(z_o) = 2\lambda a_m (b_m c_m - a_m d_m). \quad (7)$$

The functions $J_n$ and $Y_n$ in formula (4) are ordinary Bessel functions of order n of the first and second kinds, respectively. In the above formulae ($\rho_o, \theta_o, z_o$) are the cylindrical co-ordinates of the current electrode A in the relief well, I is the strength of the current emanating from A and "a" is the outer radius of the target well casing. The functions $G_i^{(n)}(\lambda)$ are defined for $z_i \leq z \leq z_{i+1}$ (e.g., z in the ith layer) with $i = 1, 2 \ldots N$ where N is the number of layers as shown in FIG. 2. In formula (5) the subscript m denotes the layer in which the A electrode is located (e.g., $z_m \leq z_o \leq z_{m+1}$). The coefficients $a_i$, $b_i$, $c_i$ and $d_i$ are determined from boundary conditions which require continuity of the potential and the component of the current density perpendicular to the layers at each interface. The 2(N−1) coefficients $a_i$ and $b_i$ are obtained, for example, from the following recursion formulae, $$a_i = M_1^{(i)} e - (\alpha_i - \alpha_{i-1})\lambda Z_i a_{i-1} + M_2^{(i)} e - (\alpha + \alpha_{i-1})\lambda Z_i b_{i-1}, \quad (8)$$

and $$b_i = M_2^{(i)} e(\alpha_i + \alpha_{i-1})\lambda Z_i a_{i-1} + M_1^{(i)} e(\alpha_i - \alpha_{i-1})\lambda Z_i b_{i-1}, \quad (9)$$

for i=2, 3, ... N, where $a_1$ is arbitrary and $b_1 = 0$. The coefficients $M_1^{(i)}$ and $M_2^{(i)}$ are defined as follows:

$$M_1^{(i)} = \tfrac{1}{2}\left(1 + \frac{\alpha_{i-1}\sigma_v^{(i-1)}}{\alpha_i \sigma_v^{(i)}}\right), \quad (10)$$

and $$M_2^{(i)} = \tfrac{1}{2}\left(1 - \frac{\alpha_{i-1}\sigma_v^{(i-1)}}{\alpha_i \sigma_v^{(i)}}\right), \quad (11)$$

where $$\alpha_i = (\sigma_h^{(i)}/\sigma_v^{(i)})^{0.5}, \quad (12)$$

with $\sigma_h^{(i)}$ and $\sigma_v^{(i)}$ the conductivity in the horizontal direction in the ith layer and the conductivity in the vertical direction, respectively. In the above formulae the $z_i$ are the co-ordinates of the interfaces of the layers. The coefficients $c_i$ and $d_i$ obey backward recursion formulae and are given by:

$$c_{i-1} = M_3^{(i)} e(\alpha_i - \alpha_{i-1})\lambda Z_i c_i + M_4^{(i)} e - (\alpha_i + \alpha_{i-1})\lambda Z_i d_i, \quad (13)$$

and
t
$$d_{i-1} = M_4^{(i)} e(\alpha_i + \alpha_{i-1})\lambda Z_i c_i + M_3^{(i)} e - (\alpha_i - \alpha_{i-1})\lambda Z_i d_i, \quad (14)$$

for i=N, N−1, ... 2, with $c_N = 0$ and $d_N$ arbitrary and where $$M_3^{(i)} = \tfrac{1}{2}\left(1 + \frac{\alpha_i \sigma_v^{(i)}}{\alpha_{i-1}\sigma_v^{(i-1)}}\right), \quad (15)$$

and $$M_4^{(i)} = \tfrac{1}{2}\left(1 - \frac{\alpha_i \sigma_v^{(i)}}{\alpha_{i-1}\sigma_v^{(i-1)}}\right), \quad (16)$$

The above formulae can be used by those skilled in the art of computer programming and numerical anaylsis to determine expected (e.g., apparent) resistivities for ULSEL and ES tools having various electrode spacings. The expected resistivity $R_a$ at the location of electrode A is determined from the formula, $$R_a = 4\pi/I(\Phi(M) - \Phi(N))(1/L(AM) - 1/L(AN))^{-1}, \quad (17)$$

where $\Phi(M)$ and $\Phi(N)$ are the respective potentials determined from the above formulae at electrodes M and N. The quantity L(AM) is the straight-line distane (in general not equal to the electrode spacing) separating the A and M electrodes in the relief well. Likewise, the quantity L(AN) is the straight-line distance (in general not equal to the electrode spacing) separating the A and N electrodes in the relief well. The distances L(AM) and L(AN) are known accurately since the co-ordinates of each station in the relief well are determined from the directional survey data (or by its interpolation).

The expected resistivities are computed for different locations of the A electrode in the relief well for ULSEL and ES tools having different electrode spacings and for different assumed positions (e.g., different values of $(x_o, y_o)$) of the target well relative to the relief well. The computations of the expected resistivities take into account: (1) the actual path of the relief well in space as determined from the directional survey data and therefore the actual locations in three-dimensional space of the A, M and N electrodes, (2) the effect of the cased target well situated in the layered medium containing the relief well for different assumed relative positions of the two wells, (3) the effect of resistivity anisotropy for the different layers in which the two wells are located, (4) the effects of different electrode spacings and configurations and (5) the effects of different target casing radii.

Figure 3:
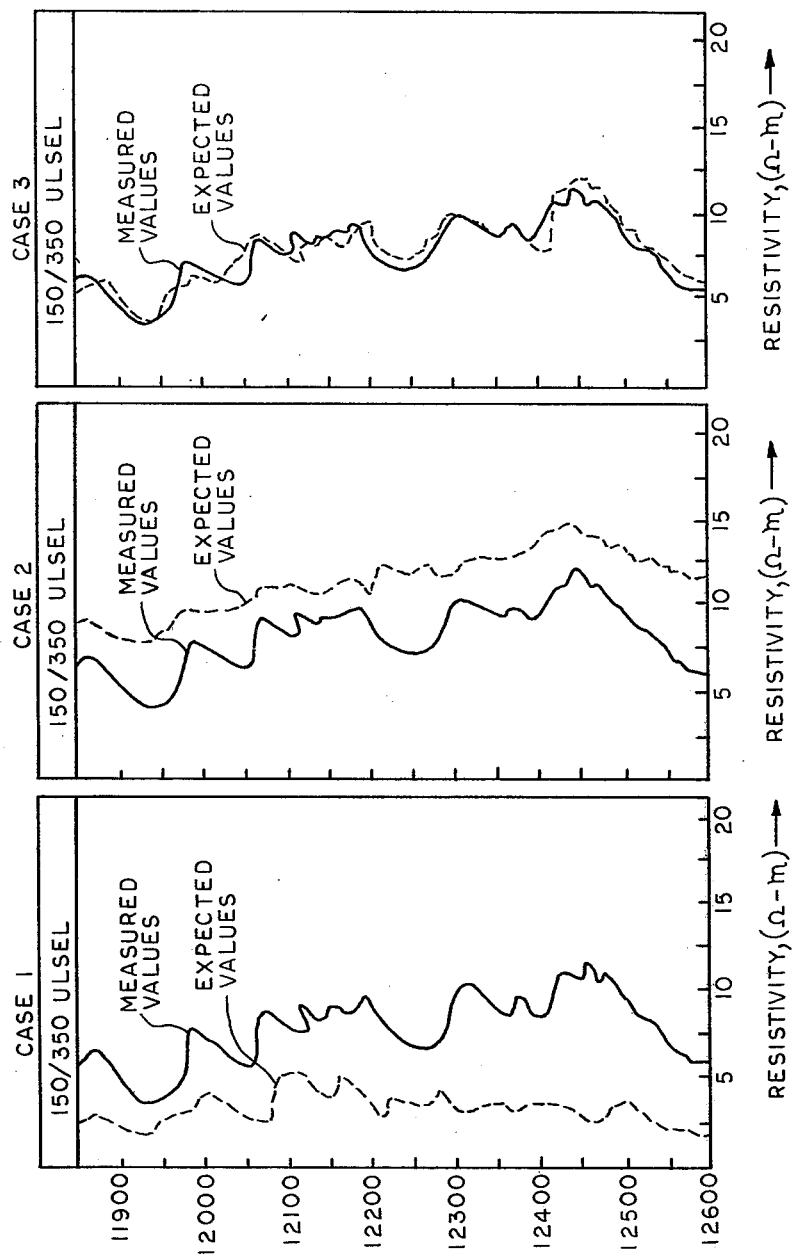
FIG. 3 illustrates the relation between the expected and measured ULSEL (150/350) resistivities for different assumed positions of a cased well relative to an open well.

The expected resistivities are determined for different assumed positions of the target well relative to the relief well and plotted versus the A electrode measured depths in the well. The three cases illustrated in FIG. 3 show the effects of varying the assumed position of the relief well relative to the target well. For case 1 the position assumed for the target well is closer than the actual position of the relief well to the target well. The expected resistivities are therefore less than the measured resistivities. For case 2 the assumed position of the target well relative to the relief well is farther than the actual relative positions. Therefore the expected resistivities are greater than the measured resistivities. For case 3 the assumed position coincides with the actual relative position and the measured and expected resistivities match. A quantitative measure of the goodness of the match can be obtained by minimizing a function $S_k$ defined by $$S_k = \sum_{i=1}^{n_s} \frac{(R_{ak}^{(i)} - R_{mk}^{(i)})^2}{(R_{mk}^{(i)})^2}, \quad (18)$$

where k denotes a particular set of ULSEL or ES spacings $R_{ak}^{(i)}$ and $R_{mk}^{(i)}$ are the expected and measured resistivities, respectively, for the A electrode at station i in the relief well. The values of $(x_o, y_o)$ which minimize $S_k$ determine the distances from each station in the relief well to the target well. In practice ULSEL and ES tools having different electrode spacings are utilized. The longer spaced tools are used to provide a long range determination of distance to casing whereas the shorter spaced tools are used when the target is within their range of investigation.

Figure 4:
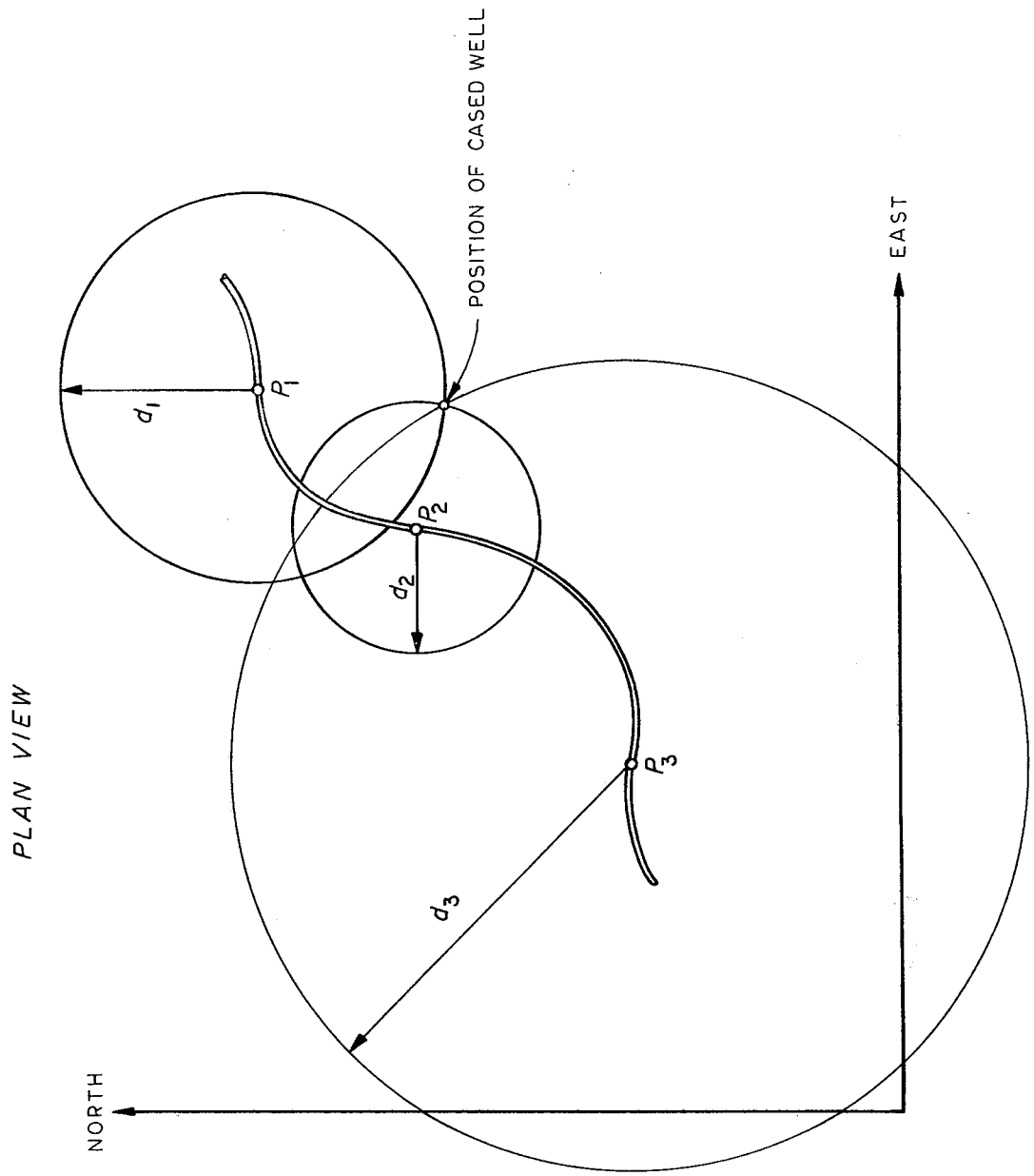
FIG. 4 is a schematic plan view of an open well trajectory illustrating means for determining the direction of a cased well relative to the open well.

In FIG. 4 is shown a schematic plan view of the relief well trajectory as determined from the directional survey data. The direction to the target well is determined for a tortuous relief well path as shown in FIG. 4. Direction to the target well is determined by choosing at least three points along the relief well path. Let these points be centers of circles whose radii are the distances to the target well which have been determined as described above. The common intersection of these circles defines the direction of the target well from the relief well. It is necessary that the relief well path be curved in order that this method determine the direction uniquely. In practice, it is advantageous to intentionally drill a curved path as the relief well approaches the target in order to make the determination of direction more accurate.

The following example illustrates the application of this method to a specific case. A cased well is blown out and flowing from a zone at 13,500'. The casing in the wild well is set to a depth of 16,045'. A directional well is drilled with the objective of intersecting the wild well at 13,500' in order to kill the flow by pumping cement and other fluids into the flowing zone. A string of protective casing is set in the relief well to a depth of 11,250'.

The approach to the intersection is done in steps. At the first step, the relief well total depth (TD) is 12,650'. The protective casing in the relief well can adversely perturb the ULSEL measured resistivities. The interval where this occurs is roughly an AM+AN spacing below the casing depth. Therefore, the interval where the measured ULSEL resistivities are valid extends from an AM+AN spacing below the protective casing to the TD of the relief well.

An induction resistivity log is obtained in the relief well from TD (12,650') to casing (11,250'). These resistivity data, induction resistivity data obtained above 11,250' in the relief well prior to its being cased, and induction log data obtained in the wild well below 12,650' prior to its being cased are utilized to construct a layered resistivity model of the earth strata penetrated by the wells. The layered model assigns resistivities and thicknesses to the earth strata.

The trajectory of the relief well in the interval from 11,250' to 12,650' is determined from a borehole directional survey. The survey data are taken at 50' intervals in the relief well and are interpolated using a computer program to obtain the spatial co-ordinates (relative to an origin in the relief well) of the relief well at one foot intervals from 11,250' to 12,650'.

The layered resistivity model and relief well co-ordinates are used as input into formulae (3)–(17) and formulae (1) to compute the expected ULSEL and ES resistivities. The computations are done for electrode spacings of 20/71, 75/150, 75/350, 75/600, 150/350 and 150/600. For each set of spacings, the expected resistivities are calculated for different positions of the A-electrode in the relief well and for different assumed relative positions (e.g., different choices for $(x_o, y_o)$ of the relief and wild well). The computations are done by a Control Data Corp. (CDC) CYBER 176 computer and the expected resistivities are plotted versus depth using software available on the CDC computer.

First, it is determined, for each of the ULSEL and ES tools, whether the wild well is within the range of investigation of the tool. This is done by first assuming that $(x_o, y_o)$ are at infinity. The expected resistivities versus depth are then computed for each of the tools and compared with the measured resistivities obtained by logging the tools in the relief well. In the present example, the measured and expected resistivities show no consistent differences for the 20/71 and 75/150 tools. Thus, it is concluded the wild well is outside the range of investigation for those two tools. For the 75/350, 75/600, 150/350 and 150/600 spacings, the measured resistivities are consistently lower than the corresponding expected resistivities which implies that the wild well is within the range of investigation of each of these tools.

The computations are repeated for the 75/350, 75/600, 150/350 and 150/600 tools using different choices for $(x_o, y_o)$. For example, in case 1 of FIG. 3, there are plotted the measured and expected resistivities for the 150/350 tool for assumed values of $x_o=60'$ and $y_o=30'$. The expected resistivities are consistently less than the measured values, indicating that the actual position of the wild well is farther from the relief well than the assumed position. In case 2 of FIG. 3, results are shown assuming that $x_o=200'$ and $y_o=80'$. Note that the expected resistivities are consistently greater than the measured values, indicating that the wild well is closer to the relief well than assumed.

In case 3 of FIG. 3, the measured and expected values are plotted for $x_o=90'$ and $y_o=60'$. There are no consistent differences in measured and expected resistivities and therefore the assumed relative position is correct. Using the values $x_o=90'$ and $y_o=60'$, the distance from each station in the relief well to the wild well can be obtained from formula (2) and the interpolated directional survey data. For example, the first station in the relief well which is taken as the origin O' (e.g. $x'_1=y'_1=0$) is a distance of 108' from the wild well. Confirmation of the correct assumed relative position is obtained by computing the expected resistivities for the 75/350, 75/600 and 150/600 tools using $x_o=90'$ and $y_o=60'$. The absence of consistent differences between the expected and corresponding measured resistivities supports the results obtained with the 150/350 tool.

The directional survey data are utilized to construct a plan view of the relief well trajectory. As illustrated in FIG. 4, the direction to the relief well is determined by choosing at least three points on the path as centers of circles whose radii are the distances of the respective centers from the wild well. The common intersection of these circles gives the direction of the wild well from the relief well.

The directional information is utilized to direct the relief well toward the wild well as the drilling of the relief well is commenced. After drilling several hundred feet further, the above steps are repeated and necessary changes made in the direction of the relief well to direct it to intersection with the wild well.

The measurements and calculations made as described above can be used in a like manner for the purpose of keeping two wells from intersecting, as in the case of wells drilled from closely spaced positions such as off-shore drilling platform.

While this invention has been described fully and completely, with special emphasis upon a single preferred embodiment, it should be understood that within the scope of the appended claims, the invention may be practiced otherwise than as specifically described herein.

I claim:

1. A method for determining distances and directions from an open well to a cased well comprising
    determining the resistivities and thicknesses of the earth strata penetrated by said wells by induction logs run in said open well or previously run in said cased well,
    determining the actual trajectory in the earth of the open well by directionally surveying said well,
    determining theoretically expected resistivity curves for long and short spaced electrode-type resistivity tools at various depths in said open well for different assumed positions of the cased well relative to the open well from said earth strata resistivities and thicknesses determined by induction logs, determining measured resistivity curves for long and short spaced electrode-type resistivity tools by logging said open well, varying the assumed relative positions of the open and cased well by translation of said theoretically expected resistivity curves until the theoretically expected resistivity curve matches the measured resistivity curve in a least squares fit mathematical sense, and determining the distances of selected points in the open well to the cased well from the amount of translation of said theoretically expected resistivity curve required to produce said match of said theoretically expected and said measured resistivity curves.

2. A method according to claim 1 including determining the direction of said cased well from said open well by constructing a plan view of the open well trajectory from said directional survey data, selecting at least three points on the trajectory as centers of circles with the radius of each circle equal to the previously determined distance of its center from the cased well, and determining the location of the cased well relative to the open well by the common intersection of said circles.

3. A method according to claim 1 wherein said spaced electrode type resistivity tools include a current electrode A and two voltage measuring electrodes M and N spaced longitudinally in said open well, the expected resistivity at the location of electrode A in the open well being determined by the formula:

$$R_a = 4\pi/I(\Phi(M) - \Phi(N))(1/L(AM) - 1/L(AN))^{-1}$$

where I is the current emanating from the A electrode,

L(AM) and L(AN) are the straight line distances from the A electrode to the M electrode and the N electrode, respectively, as determined from the directional survey data, $\Phi(M)$ and $\Phi(N)$ are the respective electrostatic potentials at the locations of electrodes M and N, the electrostatic potential $\Phi(\rho, \theta, z)$ at any point $(\rho, \theta, z)$ in the layered earth containing both the open and cased well is determined by the formula $$\phi(\rho, \theta, z) = \int_0^\infty d\lambda \sum_{n=0}^\infty \epsilon_n \cos n(\theta - \theta_o) F_n(\lambda) G_i^{(n)}(\lambda),$$

where $\epsilon_n = 1$ for $n=0$ and $\epsilon_n = 2$ for $n > 1$, functions $F_n(\lambda)$ and $G_i^{(n)}(\lambda)$ are defined by the formulae $$F_n(\lambda) = \frac{J_n(\lambda\rho)Y_n(\lambda a) - J_n(\lambda a)Y_n(\lambda\rho)}{J_n^2(\lambda a) + Y_n^2(\lambda a)},$$

and $$G_i^{(n)}(\lambda) = \frac{A_i^{(n)}(\lambda)}{J(z_o)} (a_m e^{\alpha_m \lambda z_o} + b_m e^{-\alpha_m \lambda z_o})(c_i e^{\alpha_i \lambda z} + d_i e^{-\alpha_i \lambda z}),$$

where, $$A_i^{(n)}(\lambda) = \frac{I}{2\pi\sigma_y^{(m)}} (J_n(\lambda\rho_o)Y_n(\lambda a) - Y_n(\lambda\rho_o)J_n(\lambda a)),$$

and, $$J(z_o) = 2\lambda a_m (b_m c_m - a_m d_m)$$

where $J_n$ and $Y_n$ are ordinary Bessel functions of order n of the first and second kinds, respectively, where $(\rho_o, \theta_o, z_o)$ are the cylindrical co-ordinates of the current electrode A in the relief well, I is the strength of the current emanating from A and "a" is the outer radius of the target well casing, where the functions $G_i^{(n)}(\lambda)$ are defined for z in the ith layer so that $z_i \leq z \leq z_{i+1}$ with $i = 1, 2 \ldots N$, where N is the number of layers being measured, the subscript m denotes the layer in which the A electrode is located, $z_m \leq z_o \leq z_{m+1}$, coefficients $a_i$, $b_i$, $c_i$ and $d_i$ are determined from the following recursion formulae, $$a_i = M_1(i)e^{-(\alpha_i - \alpha_{i-1})\lambda z_i} a_{i-1} + M_2(i)e^{-(\alpha_i + \alpha_{i-1})\lambda z_i} b_{i-1},$$

and $$b_i = M_2(i)e^{(\alpha_i + \alpha_{i-1})\lambda Z_i} a_{i-1} + M_1(i)e^{(\alpha_i - \alpha_{i-1})\lambda Z_i} b_{i-1}$$

for $i = 2, 3, \ldots N$, where $a_1$ is arbitrary and $b_1 = 0$, the coefficients $M_1(i)$ and $M_2(i)$ are defined as follows:

$$M_1(i) = \frac{1}{2}\left(1 + \frac{\alpha_{i-1}\sigma_v^{(i-1)}}{\alpha_i \sigma_v^{(i)}}\right),$$

and $$M_2(i) = \frac{1}{2}\left(1 - \frac{\alpha_{i-1}\sigma_v^{(i-1)}}{\alpha_i \sigma_v^{(i)}}\right),$$

where $$\alpha_i = (\sigma_h(i)/\sigma_v(i))^{0.5}$$

with $\sigma_h(i)$ the conductivity in the horizontal direction in the ith layer and $\sigma_v(i)$ the conductivity in the vertical direction, in the above formulae the $z_i$ are the co-ordinates of the interfaces of the layers, coefficients $c_i$ and $d_i$ are determined by the formulae:

$$c_{i-1} = M_3(i)e^{(\alpha_i - \alpha_{i-1})\lambda Z_i} c_i + M_4(i)e^{-(\alpha_i + \alpha_{i-1})\lambda Z_i} d_i,$$

and $$d_{i-1} = M_4(i)e^{(\alpha_i + \alpha_{i-1})\lambda Z_i} c_i + M_3(i)e^{-(\alpha_i - \alpha_{i-1})\lambda Z_i} d_i$$

for $i = N, N-1, \ldots 2$, with $c_N = 0$ and $d_N$ arbitrary and where $$M_3(i) = \frac{1}{2}\left(1 + \frac{\alpha_i \sigma_v(i)}{\alpha_{i-1}\sigma_v(i-1)}\right),$$

and $$M_4^{(i)} = \tfrac{1}{2}\left(1 - \frac{a_i \sigma_v^{(i)}}{a_{i-1}\sigma_v^{(i-1)}}\right).$$

4. A method according to claim 3 wherein
the expected resistivity curves are determined by calculations based on the actual trajectory of the open well in the earth as determined by interpolation of directional survey data taken in the well.

5. A method according to claim 3 wherein
the expected resistivity curves are determined by calculations involving the presence of a "B" electrode in the borehole of the open well.

6. A method according to claim 3 wherein
the expected resistivity curves are determined for different assumed positions of the cased well relative to the open well by varying cartesian co-ordinates $(x_o, y_o, z_o)$ which describe the relative positions of the cased and open wells.

7. A method according to claim 6 wherein
cylindrical co-ordinates $(\rho_i, \theta_i, z_i)$ of stations in the open well relative to an origin O in the cased well are defined by the formulae:

$$\rho_i = ((x'_i + x_o)^2 + (y'_i + y_o)^2)^{0.5},$$

$$\theta_i = \tan^{-1}\frac{(y'_i + y_o)}{(x'_i + x_o)}, \text{ and}$$

$$z_i = z'_i + z_o,$$

for $i = 1, 2, \ldots n_s$, where $n_s$ is equal to the number of stations at one foot intervals in the open well and where the co-ordinates, $x'_i, y'_i, z'_i$, are determined by interpolation of the directional survey data from the open well.

8. A method according to claim 6 wherein
the expected resistivity curves are determined for short and long spaced electrode-type resistivity tools having selected spacings and where the assumed values $(x_o, y_o, z_o)$ are varied in order to minimize the function $S_k$ given by the formula:

$$S_k = \sum_{i=1}^{n_s}\frac{(R_{ak}^{(i)} - R_{mk}^{(i)})^2}{(R_{mk}^{(i)})^2},$$

where the index k denotes a particular set of electrode spacings, $R_{ak}(i)$ and $R_{mk}(i)$ are the expected and measured resistivities, respectively, for the A electrode at the ith station in the open well.

9. A method according to claim 6 wherein
the particular values of $(x_o, y_o, z_o)$ which minimize $S_k$ determine the distances to the cased well of each station i in the open well according to the formula:

$$d_i = ((x'_i + x_o)^2 + (y'_i + y_o)^2)^{0.5}$$

for $i = 1, 2, \ldots n_s$.

10. A method according to claim 3 including
determining the direction of said cased well from said open well by constructing a plan view of the open well trajectory from said directional survey data,
selecting at least three points on the trajectory as centers of circles with the radius of each circle equal to the previously determined distance of its center from the cased well, and
determining the location of the cased well relative to the open well by the common intersection of said circles.

11. A method according to claim 10 wherein
the expected resistivity curves are determined by calculations based on the actual trajectory of the open well in the earth as determined by interpolation of directional survey data taken in the well.

12. A method according to claim 10 wherein
the expected resistivity curves are determined by calculations involving the presence of a "B" electrode in the borehole of the open well.

13. A method according to claim 10 wherein
the expected resistivity curves are determined for different assumed positions of the cased well relative to the open well by varying cartesian co-ordinates $(x_o, y_o, z_o)$ which describe the relative positions of the cased and open wells.

14. A method according to claim 13 wherein
cylindrical co-ordinates $(\rho_i, \theta_i, z_i)$ of stations in the open well relative to an origin O in the cased well are defined by the formulae:

$$\rho_i = ((x'_i + x_o)^2 + (y'_i + y_o)^2)^{0.5},$$

$$\theta_i = \tan^{-1}\frac{(y'_i + y_o)}{(x'_i + x_o)}, \text{ and}$$

$$z_i = z'_i + z_o,$$

for $i = 1, 2, \ldots n_s$, where $n_s$ is equal to the number of stations at one foot intervals in the open well and where the co-ordinates, $x'_i, y'_i, z'_i$, are determined by interpolation of the directional survey data from the open well.

15. A method according to claim 13 wherein
the expected resistivity curves are determined for short and long spaced electrode-type resistivity tools having selected spacings and where the assumed values $(x_o, y_o, z_o)$ are varied in order to minimize the function $S_k$ given by the formula:

$$S_k = \sum_{i=1}^{n_s}\frac{(R_{ak}^{(i)} - R_{mk}^{(i)})^2}{(R_{mk}^{(i)})^2},$$

where the index k denotes a particular set of electrode spacings, $R_{ak}(i)$ and $R_{mk}(i)$ are the expected and measured resistivities, respectively, for the A electrode at the ith station in the open well.

16. A method according to claim 13 wherein
the particular values of $(x_o, y_o, z_o)$ which minimize $S_k$ determine the distances to the cased well of each station i in the open well according to the formula:

$$d_i = ((x'_i + x_o)^2 + (y'_i + y_o)^2)^{0.5}$$

for $i = 1, 2, \ldots n_s$.

17. A method for determining distances and directions from an open well to a cased well comprising
determining the resistivities and thicknesses of the earth strata penetrated by said wells by induction logs run in said open well or previously run in said cased well, determining the actual trajectory in the earth of the open well by directionally surveying said well, determining theoretically expected resistivity curves for selected resistivity tools at various depths in said open well for different assumed positions of the cased well relative to the open well from said earth strata resistivities and thicknesses determined by induction logs, determining measured resistivity curves for said selected resistivity tools by logging said open well, varying the assumed relative positions of the open and cased well by translation of said theoretically expected resistivity curves until the theoretically expected resistivity curve matches the measured resistivity curve in a least squares fit mathematical sense, and determining the distances of selected points in the open well to the cased well from the amount of translation of said theoretically expected resistivity curve required to produce said match of said theoretically expected and said measured resistivity curves.

18. A method according to claim 1 in which said directional survey data are obtained during drilling.

* * * * *